United States Patent
Kim

(10) Patent No.: US 9,896,179 B2
(45) Date of Patent: Feb. 20, 2018

(54) SYSTEM AND METHOD FOR CONTROLLING FUEL SUPPLY TO ENGINE OF SHIP

(71) Applicant: DAEWOO SHIPBUILDING & MARINE ENGINEERING CO., LTD., Seoul (KR)

(72) Inventor: Dong Chan Kim, Busan (KR)

(73) Assignee: DAEWOO SHIPBUILDING & MARINE ENGINEERING CO., LTD., Seoul (KR)

(*) Notice: Subject to any disclaimer, the term of this patent is extended or adjusted under 35 U.S.C. 154(b) by 0 days.

(21) Appl. No.: 15/107,077

(22) PCT Filed: Jan. 30, 2015

(86) PCT No.: PCT/KR2015/001034
§ 371 (c)(1),
(2) Date: Jun. 21, 2016

(87) PCT Pub. No.: WO2016/122030
PCT Pub. Date: Aug. 4, 2016

(65) Prior Publication Data
US 2016/0362165 A1 Dec. 15, 2016

(51) Int. Cl.
| F02D 19/02 | (2006.01) |
| F02M 21/02 | (2006.01) |
| F02M 21/06 | (2006.01) |
| B63H 21/38 | (2006.01) |
| F02D 33/00 | (2006.01) |

(52) U.S. Cl.
CPC ............ *B63H 21/38* (2013.01); *F02D 19/02* (2013.01); *F02D 33/00* (2013.01);
(Continued)

(58) Field of Classification Search
CPC .......... F02D 19/02; F02D 33/00; F02M 21/02; F02M 21/06; F02M 21/0215;
(Continued)

(56) References Cited

U.S. PATENT DOCUMENTS 4,924,822 A * 5/1990 Asai .................. F02M 21/00
123/27 GE
5,690,077 A * 11/1997 Ofner ................ F02M 21/0212
123/27 GE
(Continued)

FOREIGN PATENT DOCUMENTS

KR   10-2013-0025569 A   3/2013
KR      10-1290430 B1    7/2013
(Continued)

OTHER PUBLICATIONS

International Search Report dated Oct. 29, 2015 of PCT/KR2015/001034 which is the parent application—3 pages.

*Primary Examiner* — John Kwon
*Assistant Examiner* — Johnny H Hoang
(74) *Attorney, Agent, or Firm* — Knobbe Martens Olson & Bear LLP

(57) ABSTRACT

Disclosed are a system and method for controlling fuel supply to an engine for ships. The system for controlling fuel supply to an engine for ships includes: a system operating zone in which LNG is pumped by a pump and gasified; and a supply operating zone receiving the pumped and gasified LNG from the system operating zone and supplying the LNG to the engine, wherein a preset pressure of the system operating zone is set to be higher than that of the supply operating zone.

5 Claims, 1 Drawing Sheet

(52) U.S. Cl.
CPC .... *F02M 21/0215* (2013.01); *F02M 21/0242* (2013.01); *F02M 21/0245* (2013.01); *F02M 21/06* (2013.01); *Y02T 10/32* (2013.01)

(58) Field of Classification Search
CPC .......... F02M 21/0242; F02M 21/0245; B63H 21/38; Y02T 10/32
USPC ... 123/27 GE, 445, 446, 495, 497, 502, 511, 123/525–527, 557
See application file for complete search history.

(56) References Cited

U.S. PATENT DOCUMENTS

| | | | |
|---|---|---|---|
| 5,857,448 A * | 1/1999 | Ofner | F02M 21/0212 123/525 |
| 6,868,838 B2 * | 3/2005 | Piet | F02M 31/20 123/514 |
| 8,677,981 B2 * | 3/2014 | Pursifull | F02M 31/125 123/179.21 |
| 2012/0216919 A1 | 8/2012 | Nylund | |
| 2013/0133624 A1 * | 5/2013 | Hirose | F02B 25/04 123/478 |
| 2014/0379242 A1 * | 12/2014 | Henein | F02D 35/021 701/104 |
| 2015/0040856 A1 * | 2/2015 | Oka | B63B 25/16 123/27 R |
| 2015/0369228 A1 * | 12/2015 | Kounosu | F02M 21/0212 123/27 GE |

FOREIGN PATENT DOCUMENTS

| | | |
|---|---|---|
| KR | 10-2014-0103357 A | 8/2014 |
| KR | 10-2015-0082779 A | 7/2015 |

* cited by examiner

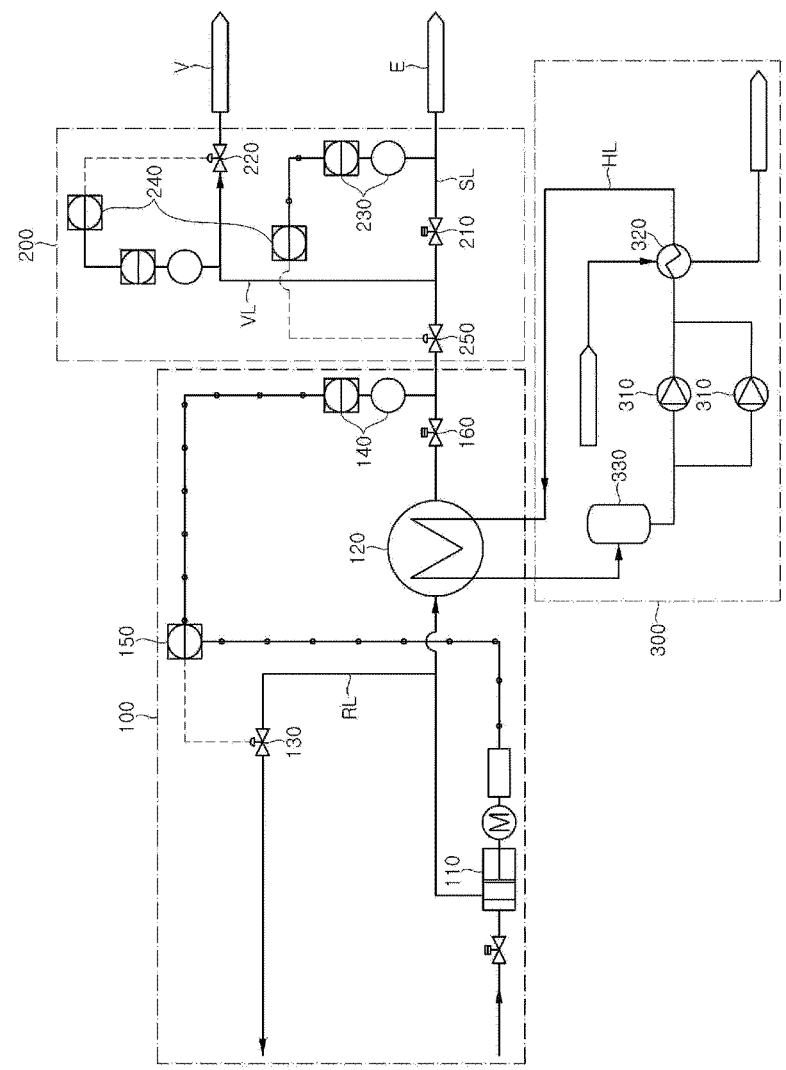

SYSTEM AND METHOD FOR CONTROLLING FUEL SUPPLY TO ENGINE OF SHIP

TECHNICAL FIELD

The present invention relates to a system and method for controlling fuel supply to an engine for ships, and more particularly, to a system for controlling fuel supply to an engine for ships that includes a system operating zone, in which liquefied natural gas (LNG) is pumped by a pump and gasified, and a supply operating zone receiving the pumped and gasified LNG from the system operating zone and supplying the LNG to the engine, in which the system operating zone is set to have a higher preset pressure than the supply operating zone and is controlled independently of the supply operating zone, and a fuel supply control method.

BACKGROUND ART

In recent years, the use of liquefied natural gas (LNG) or liquefied petroleum gas (LPG) has rapidly expanded throughout the world.

In particular, LNG is environmentally friendly due to less emission of pollutants upon combustion and is increasingly used in various fields.

LNG is a colorless transparent liquid obtained by cooling natural gas mainly including methane to about −163° C. and has a volume of about 1/600 that of natural gas. Thus, natural gas is liquefied into LNG for efficient transportation and an LNG carrier is used for marine transportation of LNG.

With strengthened international and national regulations on ships, an interest on environmentally friendly high efficiency fuel for ships has also been increased. Among such fuel, a dual fuel (DF) engine capable of using boil-off gas obtained through natural or forced gasification of LNG is developed and used for ships.

DISCLOSURE

Technical Problem

In use of LNG as fuel for ships, LNG in a cryogenic state is increased in pressure and then gasified depending upon pressure and temperature conditions for an engine.

In a ship engine, for example, a propulsion engine, since load of the engine can vary depending upon a navigation speed of the ship, it is necessary for supply pressure of fuel to be varied depending upon the load of the engine.

To this end, a valve may be provided to a front end of the engine in a fuel supply line to change the degree of opening. However, when operation of the overall system depends on such a valve, there can be problems such as frequent repair and replacement of the valve due to damage to a sheet of the valve and reduction in lifespan of the valve.

Further, the valve can be rapidly closed in order to block fuel supply to the engine, thereby causing abrupt increase in pressure of the system.

Embodiments of the present invention solve such problems and provide a fuel supply control system that can secure stable supply of fuel to an engine by allowing variable fuel supply depending upon variation of load of the engine.

Technical Solution

In accordance with one aspect of the present invention, a system for controlling fuel supply to an engine for ships includes: a system operating zone in which LNG is pumped by a pump and gasified; and a supply operating zone receiving the pumped and gasified LNG from the system operating zone and supplying the LNG to the engine, wherein a preset pressure of the system operating zone is set to be higher than that of the supply operating zone.

The system operating zone may include: a high pressure pump pumping LNG; a gasifier gasifying the LNG pumped by the high pressure pump; and a return line through which the pumped LNG introduced into the gasifier is returned from downstream of the high pressure pump to upstream of the storage tank or the high pressure pump.

The system operating zone may include: a recirculation valve provided to the return line; a first pressure detection unit detecting pressure of the system operating zone at downstream side of the gasifier; and a first controller receiving a pressure value detected by the first pressure detection unit and controlling a degree of opening of the recirculation valve and a speed of the high pressure pump depending upon the preset pressure of the system operating zone to control the pressure of the system operating zone.

The system may further include: a heat medium circulation line through which a heat medium for gasifying the LNG in the gasifier is circulated; a heat medium pump provided to the heat medium circulation line and pumping the heat medium to be introduced into the gasifier; and a heat medium heater heating the heat medium at a downstream side of the heat medium pump.

The supply operating zone may include: a supply line through which the LNG gasified by the gasifier is supplied to the engine; a main gas valve provided to the supply line; and a vent line branched from the supply line at an upstream side of the main gas valve, and when the pressure of the supply line increases above the preset pressure of the supply operating zone, the main gas valve is closed and the gasified LNG is discharged through the vent line.

The supply operating zone may include: a pressure regulation valve provided to the vent line; a second pressure detection unit detecting the pressure of the supply operating zone at a downstream side of the main gas valve; and a second controller receiving a pressure value detected by the second pressure detection unit and controlling opening or closing of the main gas valve and the pressure regulation valve depending upon the preset pressure of the supply operating zone to control the pressure of the supply operating zone.

The system may further include: a first shut-off valve disposed downstream of the gasifier and a second shut-off valve disposed upstream of a point where the vent line is branched from the supply line.

In accordance with another aspect of the present invention, a method of controlling fuel supply to an engine for ships includes: 1) pumping LNG using a pump, followed by gasifying the LNG; and 2) supplying the pumped and gasified LNG to the engine for ships, wherein operation is carried out by setting a preset pressure of a zone in which step 1 is performed to be higher than a preset pressure of a zone in which step 2) is performed.

The pressure of the zone in which step 1) is performed may be controlled by controlling a speed of the pump or by returning the pumped LNG to a storage tank or upstream side of the pump based on a detected pressure value of the pumped and gasified LNG.

The pressure of the zone in which step 2) is performed may be controlled by closing a valve to block supply of the pumped and gasified LNG into the engine while discharging the gasified LNG from the zone in which step 2) is performed, when pressure of the pumped and gasified LNG introduced into the engine for ships is higher than the preset pressure of the zone in which step 2) is performed, based on a detected pressure value of the pumped and gasified LNG introduced into the engine for ships.

In accordance with another aspect of the present invention, a system for controlling fuel supply to an engine for ships includes: a system operating zone in which LNG is pumped by a pump and gasified; and a supply operating zone receiving the pumped and gasified LNG from the system operating zone and supplying the LNG to the engine, wherein pressure of the system operating zone is controlled independently of the pressure of the supply operating zone.

In accordance with a further aspect of the present invention, a method of controlling fuel supply to an engine for ships includes: pumping LNG using a pump, followed by gasifying the LNG; and 2) supplying the pumped and gasified LNG to the engine for ships, wherein pressure of a zone in which step 1) is performed is controlled independently of the pressure of a zone in which step 2) is performed.

Advantageous Effects

Embodiments of the preset invention provide a system for controlling fuel supply to an engine for ships that includes a system operating zone in which LNG is pumped by a pump and gasified, and a supply operating zone receiving the pumped and gasified LNG from the system operating zone and supplying the LNG to the engine, in which the system operating zone is set to have a higher preset pressure than the supply operating zone and is controlled independently of the supply operating zone, and a fuel supply control method.

As such, fuel is forced to pass the system operating zone before the fuel is directly supplied into the engine, and the system operating zone is controlled independently of the supply operating zone, whereby variable fuel supply can be stably achieved.

In addition, since control of supply pressure is not performed only by a main gas valve, lifespan of the valve can be extended to reduce costs for maintenance and replacement of the valve while preventing operation interruption of the system.

DESCRIPTION OF DRAWINGS

FIG. 1 is a schematic diagram of a system for controlling fuel supply to an engine for ships according to one embodiment of the present invention.

EMBODIMENTS

The above and other aspects, advantages and objects of the present invention will become apparent from the accompanying drawings and descriptions of the following embodiments of the present invention.

Hereinafter, embodiments of the present invention will be described in detail with reference to the accompanying drawings. Like components will be denoted by like reference numerals.

FIG. 1 is a schematic diagram of a system for controlling fuel supply to an engine for ships according to one embodiment of the present invention.

Referring to FIG. 1, a fuel supply control system according to this embodiment is a system for controlling fuel supply to an engine E for ships, and includes a system operating zone 100 in which LNG is pumped by a pump and gasified, and a supply operating zone 200, which receives the pumped and gasified LNG from the system operating zone 100 and supplies the LNG to the engine E, wherein a preset pressure of the system operating zone 100 is set to be higher than the preset pressure of the supply operating zone 200.

As used herein, the term "ship" refers not only to ships such as LNG carriers or LNG fueled ships (LFSs), but also to marine plants such as LNG-FSPPs (floating storage power plants), and includes all kinds of ships or marine structures having an engine that receives LNG as fuels for propulsion or power generation.

The engine E for such ships may include, for example, a DF engine or an ME-GI engine. In this embodiment, the engine E for ships may be a high pressure gas injection engine, or an ME-GI (MAN Electric Gas Injection) engine which receives a high pressure gas of 150 to 400 bar as fuel.

The ME-GI engine can be used in ships and is a high pressure natural gas injection engine of an LNG carrier, which is developed to reduce emission of nitrogen oxides (NOx) and sulfur oxides (SOx). The ME-GI engine may be equipped in a ship or marine structure such as an LNG carrier and the like, which stores LNG in a storage tank capable of enduring a cryogenic condition during transportation of LNG, and may employ natural gas and diesel as fuel. The ME-GI engine requires a high gas supply pressure of about 150 to 400 bara (absolute pressure) depending upon load thereof, and is spotlighted as an eco-friendly next generation engine by reducing emission of pollutants, for example, carbon dioxide by 23%, nitrogen compounds by 80% and sulfur compounds by 95% or more, as compared with a diesel engine outputting the same level of power. For supply of LNG to the ME-GI engine, a fuel supply system is configured to supply boil-off gas (BOG) generated in the storage tank or to supply gasified LNG obtained through gasification of LNG after compression of LNG at high pressure.

For such fuel supply, the system operating zone 100 according to this embodiment is provided with a high pressure pump 110 configured to pump LNG and a gasifier 120 which gasifies the LNG pumped by the high pressure pump 110, and a heat medium supply zone 300 is constituted to supply a heat medium which performs heat exchange with the LNG in the gasifier 120.

The heat medium supply zone 300 may be provided with a heat medium circulation line HL through which the heat medium for gasification of LNG in the gasifier 120 is circulated, a heat medium pump 310 provided to the heat medium circulation line HL and pumping the heat medium to be introduced into the gasifier 120, a heat medium heater 320 disposed downstream of the heat medium pump 310 and heating the heat medium, a heat medium tank 330 disposed downstream of the gasifier 120 and storing the heat medium having been subjected to heat exchange in the gasifier 120, and the like. As the heat medium supplying heat to the gasifier 120, for example, glycol water may be used, and the heat medium heater 320 may heat the heat medium using steam generated by waste heat generated in an internal combustion engine of the ship.

For pressure control in the system operating zone 100, the system operating zone 100 includes a return line RL through which the pumped LNG introduced into the gasifier 120 is returned from a downstream side of the high pressure pump 110 to a storage tank (not shown) or an upstream side of the high pressure pump 110, and the return line RL is provided with a recirculation valve 130.

In addition, the system operating zone 100 is provided with a first pressure detection unit 140 that detects pressure of the system operating zone 100 at a downstream side of the gasifier 120, and a first controller 150 that receives a pressure value detected by the first pressure detection unit 140 and controls the pressure of the system operating zone 100 by regulating a degree of opening of the recirculation valve 130 and a speed (rpm) of the high pressure pump 110 according to a preset pressure of the system operating zone 100.

The supply operating zone 200 is provided with a supply line SL for supplying the LNG gasified by the gasifier 120 to the engine E, and a main gas valve 210 provided to the supply line SL to open or close the supply line SL.

For pressure control in the supply operating zone 200, the supply operating zone 200 includes a vent line VL branched from the supply line SL at an upstream side of the main gas valve 210, a pressure regulation valve 220 provided to the vent line VL, and a second pressure detection unit 230 detecting pressure of the supply operating zone 200 at a downstream side of the main gas valve 210.

A pressure value detected by the second pressure detection unit 230 is sent to a second controller 240, which controls the pressure of the supply operating zone 200 by closing the main gas valve 210 while allowing gasified LNG to be discharged to the vent line VL when the pressure of the supply line SL is higher than the preset pressure of the supply operating zone 200. The preset pressure of the supply operating zone 200 is set to a required supply pressure according to load of the engine E for ships, and when it is determined that the pressure of the supply operating zone 200 exceeds this pressure value, the pressure of the supply operating zone 200 is regulated by closing the main gas valve 210 while opening the pressure regulation valve 220 such that gas is discharged to a vent mast by an amount corresponding to surplus pressure.

In this way, the second controller 240 controls the pressure of the supply operating zone 200 by controlling opening/closing of the main gas valve 210 and the pressure regulation valve 220 depending upon the preset pressure of the supply operating zone 200.

As such, in the system according to this embodiment, the preset pressure of the system operating zone 100 is set to be higher than that of the supply operating zone 200, and each operating zone is independently controlled, thereby enabling variable operation of the fuel supply system depending upon engine load.

In this embodiment, fuel is allowed to pass through the system operating zone 100 before the fuel is directly supplied into the engine, thereby reducing deviation in supply pressure. Further, since the preset pressure of the system operating zone 100 is set to be higher than that of the supply operating zone 200, a surplus portion can be secured even upon rapid increase in output of the engine, thereby providing an advantage of reducing following time.

In operation of the fuel supply system, the preset pressure of the system operating zone 100 set to be higher than that of the supply operating zone 200 may be determined through an actual commissioning procedure depending upon installation locations of the engine and the fuel supply system. For example, when an ME-GI engine is used and the pressure of the supply operating zone is 230 barg, the preset pressure of the system operating zone may be set to be about 20 barg higher than the preset pressure of the supply operating zone, and when the supply operating zone is 300 barg, the preset pressure of the system operating zone may be set to be about 5 barg higher than the preset pressure of the supply operating zone.

In the system according to this embodiment, a first shut-off valve 160 may be disposed downstream of the gasifier 120 and a second shut-off valve 250 may be disposed upstream of a point at which the vent line VL is branched from the supply line SL. With such configuration of the shut-off valves to divide the operating zones from each other, the system can be controlled such that each of the operating zones can be set to have a different preset pressure.

In the system according to the present invention, fuel supply is performed as follows.

Fuel supply to an engine E for ships is achieved by a method including: 1) pumping LNG using a pump, followed by gasifying the LNG; and 2) supplying the pumped and gasified LNG to the engine E for ships.

In the present invention, the system is operated by setting a preset pressure of a zone in which step 1 is performed, that is, the preset pressure of the system operating zone 100, to be higher than a preset pressure of a zone in which step 2) is performed, that is, the preset pressure of the supply operating zone 200.

As described above, the pressure of the system operating zone 100 may be controlled by controlling a speed of the pump or by returning the pumped LNG to a storage tank or an upstream side of the pump based on a detected pressure value of the pumped and gasified LNG.

In addition, as described above, the pressure of the supply operating zone 200 may be controlled by closing a valve to block supply of the pumped and gasified LNG into the engine E while discharging the gasified LNG to a vent mast through the vent line VL branched from the supply line SL, when the pressure of the pumped and gasified LNG introduced into the engine E is higher than the preset pressure of the supply operating zone 200, based on a detected pressure value of the pumped and gasified LNG introduced into the engine E for ships.

It is apparent to those skilled in the art that the present invention is not limited to the above embodiments and various modifications or variations can be made without departing from the scope of the present invention.

The invention claimed is:

1. A system for supplying fuel to an engine, the system comprising:
   a pump configured to pump LNG;
   a gasifier configured to gasify pumped LNG from the pump for generating gasified LNG;
   a recirculation valve configured to return at least part of the pumped LNG from the pump to an LNG tank;
   a gas pipeline connecting between the gasifier and a fuel supply line for the engine;
   a shutoff valve installed on the gas pipeline downstream the gasifier;
   a main valve installed on the gas pipeline downstream the shutoff valve;
   a first pressure sensor configured to detect a first pressure on the gas pipeline downstream the main valve;
   a second pressure configured to detect a second pressure on the gas pipeline upstream the shutoff valve;
   a vent line branched off the gas pipeline between the shutoff valve and the main valve;
   a pressure regulation valve installed on the vent line;
   at least one controller configured to control operation of the pump, the recirculation valve, the shutoff valve, the main valve and the pressure regulation valve based on a load of the engine, the first pressure detected by the first pressure sensor, and the second pressure detected by the second pressure sensor such that:
  opening and closing of at least one of the main valve and the pressure regulation valve are controlled to make the first pressure detected by the first pressure sensor downstream the main valve follow a first preset pressure corresponding to a required supply pressure for the load of the engine, and
  rotational speed of the pump and a degree of opening of the recirculation valve are controlled to make the second pressure detected by the second pressure sensor upstream the shutoff valve follow a second preset pressure as higher than the first preset pressure by a pressure difference that is maintained by the shutoff valve and the main valve.

2. The system according to claim 1, wherein the gasifier comprises a heat exchanger.

3. The system according to claim 1,
  wherein the shutoff valve is referred to a first shut-off valve,
  wherein the system further comprises a second shut-off valve installed on the gas pipeline upstream the first shut-off valve, and
  wherein the second pressure sensor is configured to detect the second pressure between the first shut-off valve and the second first shut-off valve.

4. The system for controlling fuel supply to an engine for ships according to claim 1,
  wherein the second pressure upstream the shutoff valve is controlled independently from the first pressure downstream the main valve.

5. A method for supplying fuel to an engine, comprising:
  providing the system of claim 1;
  pumping LNG using the pump;
  gasifying pumped LNG from the pump for generating gasified LNG using the gasifier;
  supplying gasified LNG from the gasifier to the engine via the gas pipeline;
  controlling opening and closing of the main valve and the pressure regulation valve to make the first pressure detected by the first pressure sensor downstream the main valve follow the first preset pressure corresponding to the required supply pressure for the load of the engine; and
  controlling rotational speed of the pump and a degree of opening of the recirculation valve to make the second pressure detected by the second pressure sensor upstream the shutoff valve follow the second preset pressure higher than the first preset pressure by a pressure difference that is maintained by the shutoff valve and the main valve.

* * * * *